United States Patent
Oppenheimer

(10) Patent No.: US 6,799,478 B1
(45) Date of Patent: Oct. 5, 2004

(54) ANEMOMETER METHOD AND APPARATUS

(76) Inventor: Michael Oppenheimer, 1825 S. Nugent Rd., Lummi Island, WA (US) 98262

( * ) Notice: Subject to any disclaimer, the term of this patent is extended or adjusted under 35 U.S.C. 154(b) by 0 days.

(21) Appl. No.: 09/692,895

(22) Filed: Oct. 19, 2000

(51) Int. Cl.$^7$ ................................................. G01P 5/06
(52) U.S. Cl. .................................. 73/861.85; 73/861.57
(58) Field of Search .............................. 73/861.85, 713, 73/736, 732, 716, 861, 147, 861.55, 861.57

(56) References Cited

U.S. PATENT DOCUMENTS

| | | | |
|---|---|---|---|
| 2,707,879 A | * 5/1955 | Dwyer | ........................ 73/209 |
| 2,838,932 A | 6/1958 | Dwyer | |
| 2,993,374 A | 7/1961 | Dwyer et al. | |
| 3,359,795 A | 12/1967 | Walsh | |
| 3,675,481 A | * 7/1972 | Phillips | ........................ 73/209 |
| 4,317,376 A | * 3/1982 | Fitzpatrick | ............... 73/861.55 |
| 4,387,629 A | 6/1983 | Bolton | |
| 4,467,960 A | 8/1984 | Doyle, Jr. | |
| 4,896,534 A | 1/1990 | Daly | |
| 5,349,334 A | 9/1994 | Parson | |
| 5,507,190 A | * 4/1996 | Guttmann | .............. 73/861.057 |
| 5,549,277 A | * 8/1996 | Franz | ........................ 251/223 |

* cited by examiner

Primary Examiner—Harshad Patel
(74) Attorney, Agent, or Firm—Robert B. Hughes; Hughes Law Firm, PLLC

(57) ABSTRACT

An anemometer that visually indicates the speed of the wind by the position of a float housed within a first chamber. The first chamber is in communication with a second chamber through a vertically extending conduit system. The second chamber is in communication with a low-pressure zone of a push differentiating system preferably a Venturi.

10 Claims, 12 Drawing Sheets

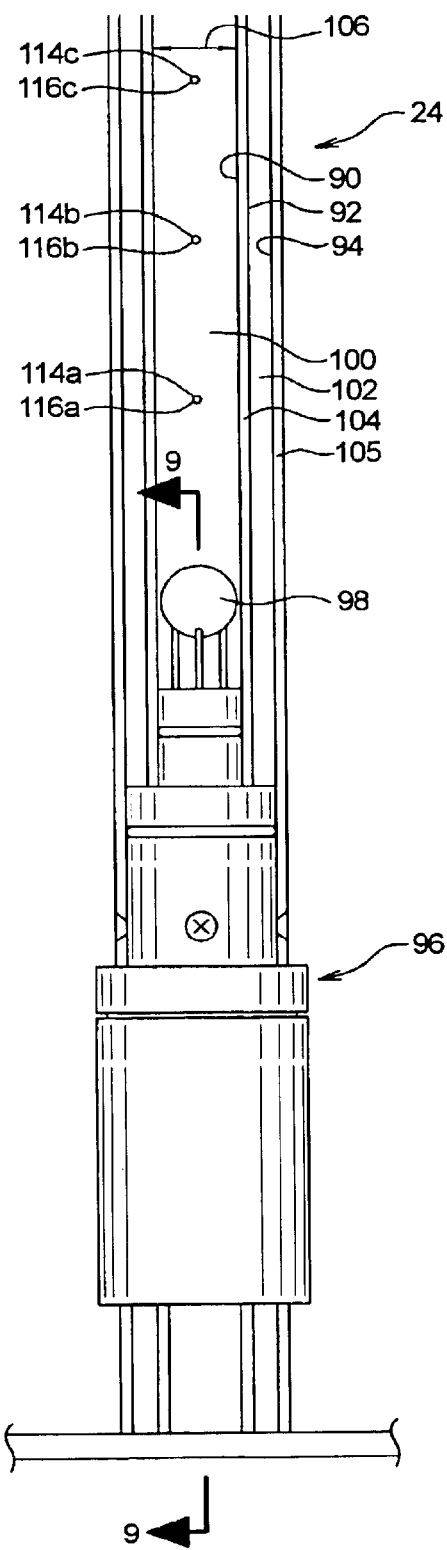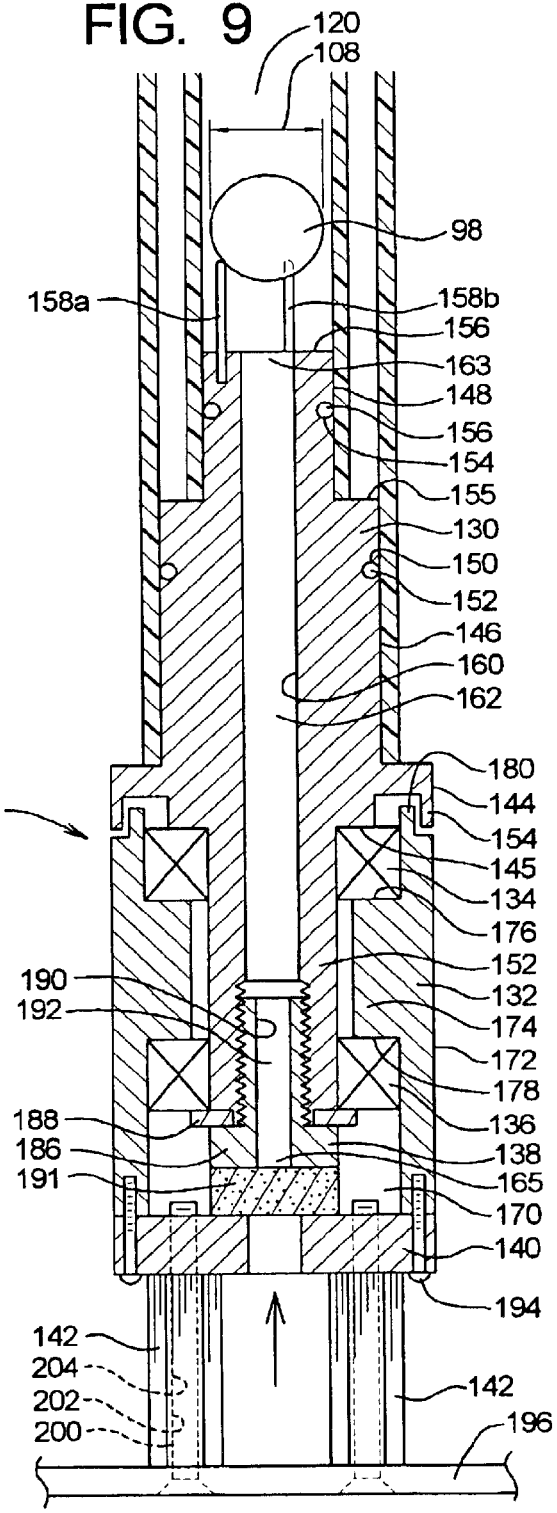

ANEMOMETER METHOD AND APPARATUS

FIELD OF THE INVENTION

The invention relates to wind measuring devices commonly referred to as anemometers. In particular, the present invention visually displays the change in wind velocity with respects to the apparatus.

BACKGROUND

The apparatus is a low-pressure sensing device that visually displays a low-pressure at a distance. In the preferred form, the apparatus is an anemometer that visually represents the wind speed by displacing a float.

SUMMARY OF THE INVENTION

The apparatus is an anemometer that measures wind velocity relative to the anemometer. The anemometer comprises a pressure differentiating system and a pressure indicating system. The pressure differentiating system has a low-pressure portion and a low-pressure conduit that has a first end portion and a second end portion. The first end portions is in communication with the low-pressure area of the pressure differentiating system. The pressure indicating system is defined to have a vertical axis, a first surface, a second surface, a third surface, and a float. The first surface substantially defines a first chamber that has a substantially constant cross-sectional area with respect to the vertical location along the first chamber. Located in the lower portion of the first chamber is a lower surface defining second conduit having a first portion and a second portion where the first portion is in communication with the first chamber and the second portion is in communication with the ambient air. The second surface and the third surface substantially defines a second chamber, The second end portion of the low-pressure conduit is in communication with the second chamber. The float is positioned in the first chamber above the first portion of the second conduit. A first sub chamber is defined as the portion of the first chamber that is located above the float. A second sub chamber is defined as the portion of the first chamber that is located below the float. As low-pressure develops in the low pressure area of the pressure differentiating system, a low-pressure develops in the second chamber (via the first conduit). This causes air to flow from the first chamber to the second chamber through the conduit system and air flows from the second conduit to the second sub chamber. A portion of this inflowing ambient air flows to the first sub chamber causing lift upon the float.

In the preferred form the pressure differentiating system is a Venturi that has a front portion a central portion and a rearward portion. The central portion is the low-pressure portion of the pressure differentiating system. The conduit system can be a plurality of orifices positioned vertically along the first chamber. In another form the conduit system can be a vertically extending slit extending vertically along the first chamber. A bearing system is employed to allow the Venturi to rotate in the substantially horizontal plane. The rearward portion of the Venturi supplies sufficient air drag to orientation the front portion of the Venturi to properly face the wind.

BACKGROUND ART

A search of the patent literature has a number of patents directed toward when measuring devices, these being the following:

U.S. Pat. No. 5,349,334 Parson, shows a roof mounted high speed wind sensor that includes a combined wind vane and scoop. The vane aligns the intake of the scoop where the wind channels through the wind scoop assembly 18 and applies pressure against piston 28, and conductive member 34 closes a switch (electrical contacts 36) to the to sound an alarm.

U.S. Pat. No. 4,896,534 Daly, shows a wind speed sensor that is intended to be mounted on the mast supporting shroud line on a sail boat. The wind sensor is provided with a fin 24 that aligns the wind meter 20. As seen in FIG. 4. There are openings 66 in the body of the sensor through where air enters. Apparently, the air is channeled vertically around the conduit that houses float 32 so as to raise float 32 to a height proportional to the wind speed. As seen in the column 5, line 60 of the detailed description of the preferred embodiments, apparently the flow of air is completed by exiting from outlets opening 88. The flow guide 72 allows an increase in cross-sectional area which of course reduces the velocity of vertical flowing air as it travels upwardly.

U.S. Pat. No. 4,467,960 Doyle, shows a venting system in which a vane 50, aligns intake 36 into the wind so that air is forced through tube 28 past exhaust gasses to provide fresh heated air to a room.

U.S. Pat. No. 4,387,629 Bolton, shows an air evacuation device 10 where the housing 12 is direct into the wind by virtue of its shape so that air entering at 18 causes a low pressure zone just after baffle 20. This causes air to draw upwardly through the vertical tube. As disclosed in column 8 starting at line 30, it appears that the purpose of invention is to prevent the roof of a house from being blown off in very high winds.

U.S. Pat. No. 3,359,795 Walsh, shows several embodiments of a wind speed measuring device in which the wind passes through a venturi and actuates a fluid pressure gauge with its pick up tube at the low pressure area of the venturi. As seen in FIG. 5, there is a venturi tube that is directed into the wind by fin 132. The other embodiments show convex surfaces arranged so that air flows therebetween. The air may come from any direction so that an alignment means is not required. As shown in FIG. 1, the convex elements 14 and 16 are omnidirectional and a anemometer 78 is provided. As seen in FIG. 4, the convex plates move toward each other under the influence of a low-pressure area therebetween. The air velocity scale 84 is calibrated to read wind speeds given a vertical displacement.

U.S. Pat. No. 2,993,374. Dwyer et al, shows a fluid speed measuring device which is intended to detect air velocity such as air flowing from an air conditioning grill. It is not readily apparent how the device works. As seen FIG. 4, air supplied through the ports 22 and the air flows through an annular gap 20 and into the inner chamber defined by float tube 11. There must be a low pressure zone above the float 13 for it to rise. However, it is not apparent in the how this low pressure zone is exactly created. The orifice 25 is open the high range number system 33H should be used.

U.S. Pat. No. 2,838,932 Dwyer, shows a roof mounted air intake tube 14. The wind vane 12 provides drag to direct the pitot tube 14 into the wind. As seen in FIG. 2, there is a vertical cross-sectional view and the rubber stopper 43 does not allow communication between ports 44 and 46. The pitot tube 14 converts the moving air into static pressure. Apparently the weather trap 20 is used to prevent fluid or debris from entering into the upper tube 26. The anemometer 50 to tax the pressure difference between portions 48 and 49 to produce an accurate measure of the wind.

The background art such as U.S. Pat. No. 4,896,534 lifts a float by adjusting the air flux by effectively increasing the cross-sectional area of air flow of the chamber the float is housed in. This requires using a chamber that is nonuniform in cross-sectional area with respects to the vertical location and the chamber.

Other methods for measuring wind velocity include creating a low-pressure in a U-shaped tube filled with fluid such as that shown in U.S. Pat. No. 3,359,795.

The prior art fails to show an anemometer with the features that are described herein. A combination of a first chamber with a constant cross-sectional area where the flow of air changes with respects to the vertical location of the first chamber. The flow is adjusted by conduit system that allows passage of air from the first chamber to the second chamber. The second chamber is in communication with a low pressure zone of a pressure differentiating device. In the preferred form the pressure differentiating device is a Venturi. In the broader scope of invention other pressure differentiating means could be employed; however, the Venturi with a bearing system indicates the direction of the wind as well as the air velocity.

One other feature of the present invention is its ability to withstand the weather. The configuration of the preferred embodiment reduces the odds of moisture entering any of the chambers. Further, the preferred form inhibits the flow of dust and debris into the chambers.

By having a constant horizontal cross-sectional area in the first chamber, the apparatus is much easier to manufacture than prior art apparatuses that employ and increasing cross-sectional area in a chamber. Further, by employing a constant cross-sectional area in the first chamber it is easy to scale the apparatus. The first chamber could have a vertical height of a few inches or be as high as 30 feet or more.

In the preferred form the first chamber is defined by a transparent cylindrical tubing that is commonly available in a variety of diameters and lengths. To adjust the air flow within the chamber, a by conduit system is provided to the second chamber. The availability of transparent cylindrical tubing eases manufacturing of the anemometer and allows to produce a variety of heights and widths of the anemometer.

BRIEF DESCRIPTION OF THE DRAWINGS

FIG. 8 is a front view of the base portion of the apparatus;

FIG. 9 is a vertical cross-sectional view taken at line 9—9 in FIG. 8;

DETAILED DESCRIPTION OF THE PREFERRED EMBODIMENT

Throughout this description reference is made to top and bottom, front and rear. These orientation terms, such as front and rear, are obviously used for aiding the description and are not meant to limit the invention to any specific orientation.

In the following text, there will first be a description of the overall operations of the present invention followed by a detailed description of a preferred embodiment and alternative embodiments where emphasis is stressed that other variations could be employed without departing from the spirit and scope of the numbered claims following the specification.

Figure 1:
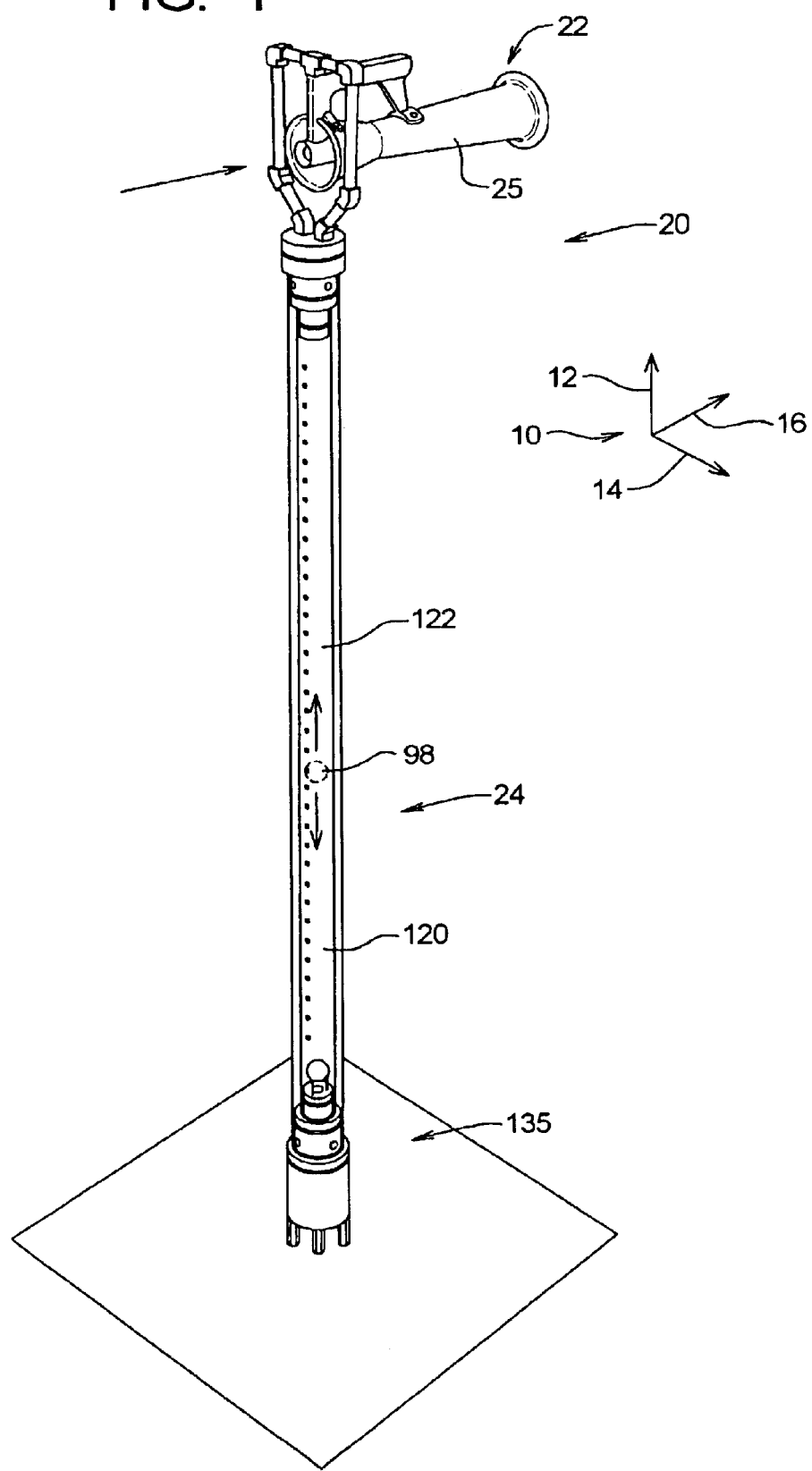
FIG. 1 is isometric view of the apparatus where the wind is illustrated by the upper arrow and the movement of the float is illustrated by the vertical arrows.

To ease explanation an axis system is defined relative to the orientation of the Venturi 25. As seen in FIG. 1, the axis system 10 comprises a vertical axis 12, a lateral axis 14 and a longitudinal axis 16. In the preferred embodiment, the pressure indicating system 24 is symmetric with respect to the lateral axis and a longitudinal axis. Therefore, when discussing the pressure indicating system 24 the term "radial" will indicate either the lateral axis 14 or the longitudinal axis 16. Of course this only concerns the preferred embodiment and not necessarily the possible broader scope of the present invention that do not incorporate a cylindrical structured about the vertical axis.

Figure 2:
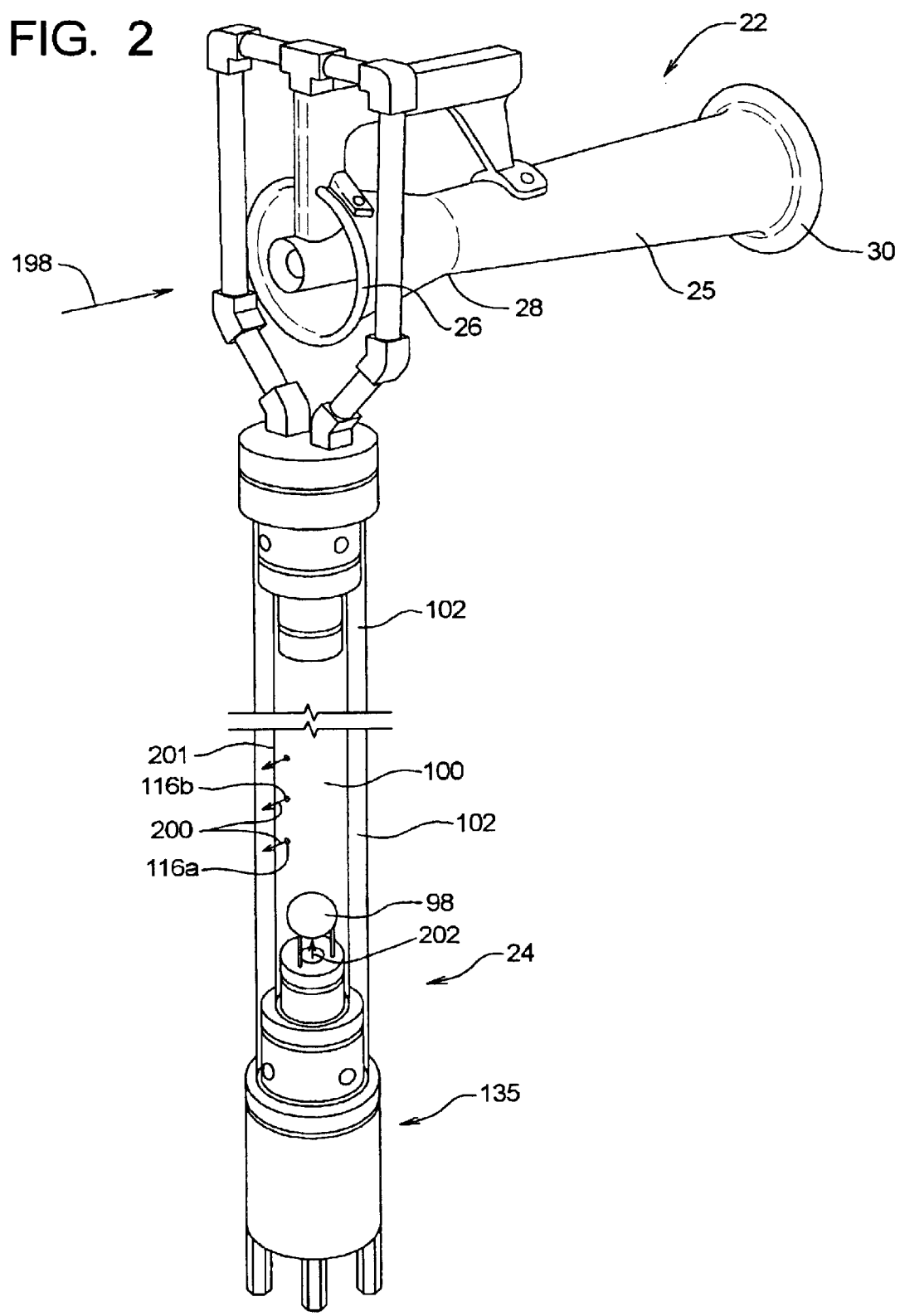
FIG. 2 is isometric view of a close-up of the upper portion of the apparatus (the pressure differentiating system) and a close-up of the base portion of the apparatus.
Figure 3:
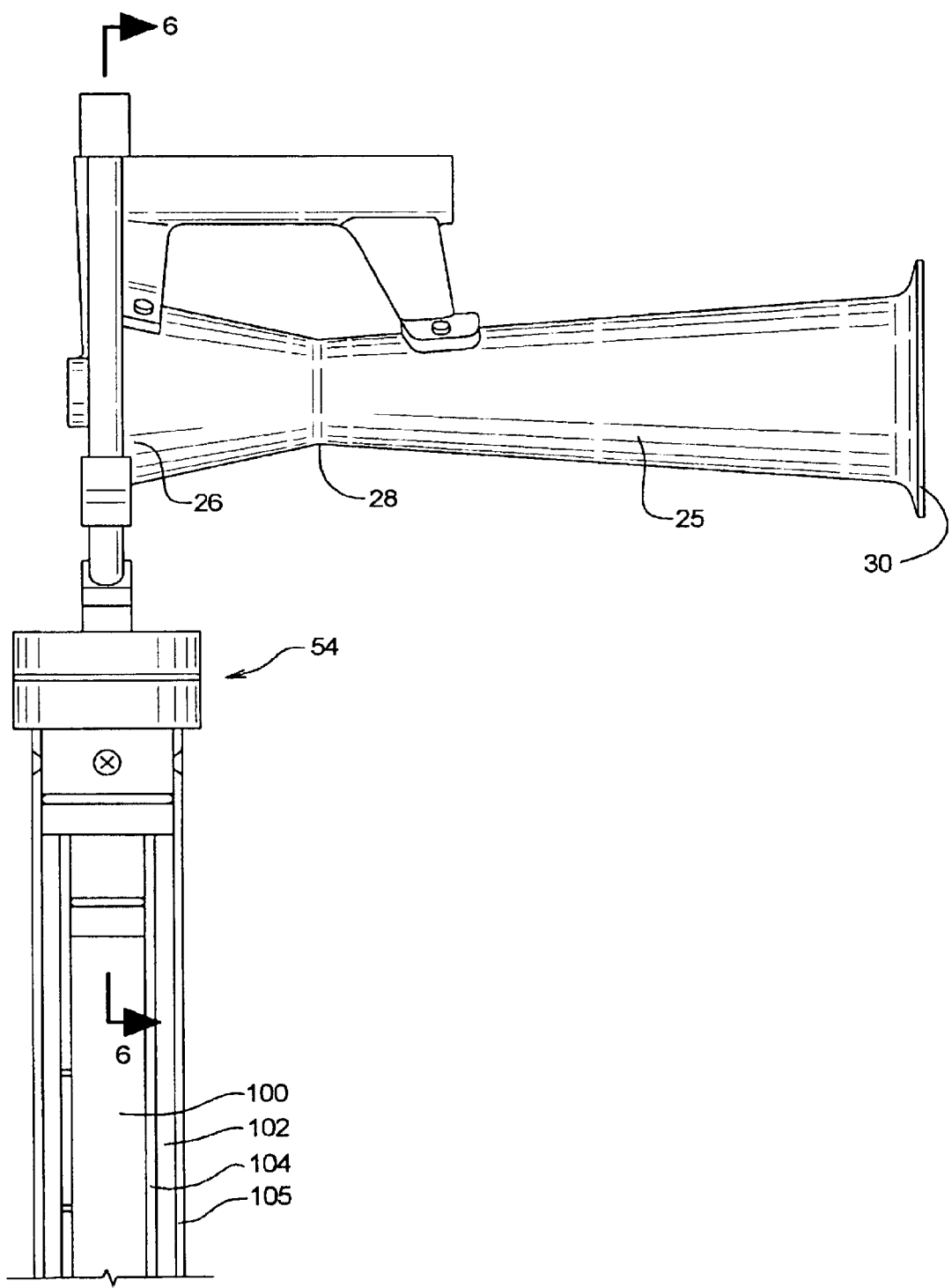
FIG. 3 is a side view of the pressure differentiating system.
Figure 4:
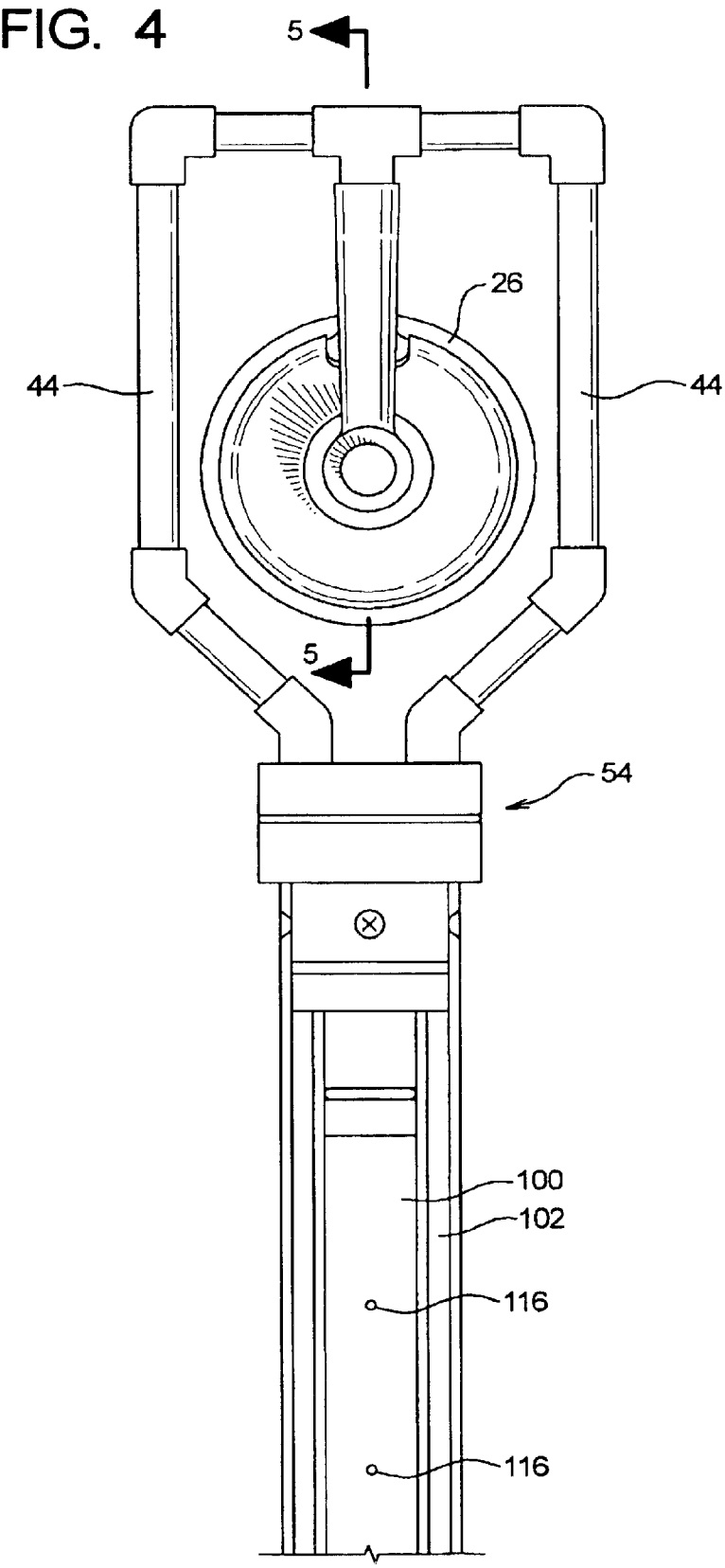
FIG. 4 is a front view of the pressure differentiating system.
Figure 5:
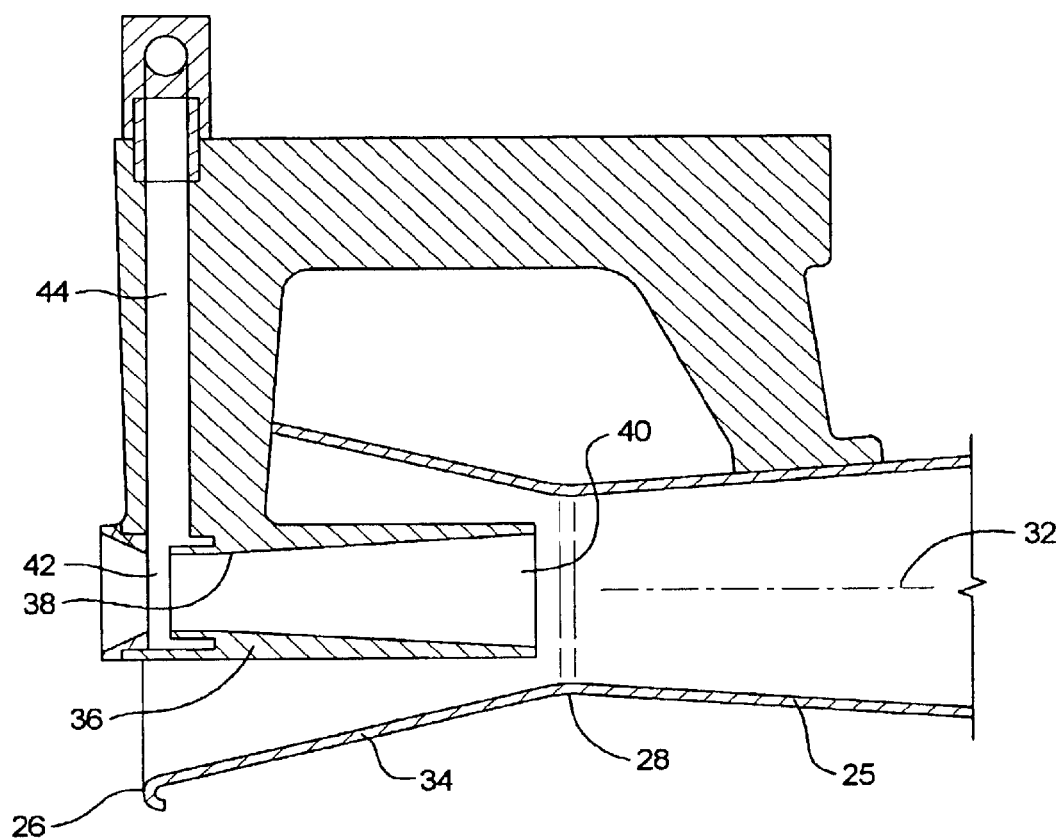
FIG. 5 is a vertical cross-sectional view taken and line 5—5 in FIG. 4.

The apparatus or anemometer 20 comprises a pressure differentiating system 22 and a pressure indicating assembly 24. In the preferred form, the pressure differentiating system 22 is a common Venturi 25 as seen in FIG. 2 that has a forward portion 26, a central constricted section 28 and a rearward portion 30. The Venturi 25 a central constricted section 28 and a rearward portion 30. The Venturi 25 has a center longitudinal axis 32 and comprises an outer shell 34 and an inner passage assembly 36. The inner passage assembly 36 defines an inner surface 38 that is conically shaped and has a center concentric with axis 32 in the preferred form. The inner passage assembly has the rearward opening 40 that is in proximity to the central constricted section 28. There is a concentric opening 42 located in the more forward portion of the inner passage assembly 36 that is in communication with conduit 44.

The Venturi 25 is adapted to receive incoming wind in the forward portion 26 through the inner surface of the outer shell 34 and through the inner surface of the inner passage assembly 36. Due to the kinetic properties of the moving air accelerating at the constricted portion 28, a low-pressure develops, likewise a low-pressure develops in the slightly constricted conduit opening 42 of the inner passage assembly 36. Therefore a low-pressure relative to the ambient air develops in conduit 44. The conduit 44 has a first portion 45 that is in communication with the low pressure area of the Venturi 25. The conduit 44 further has a second portion 47 that is in communication with the second chamber 102.

Figure 6:
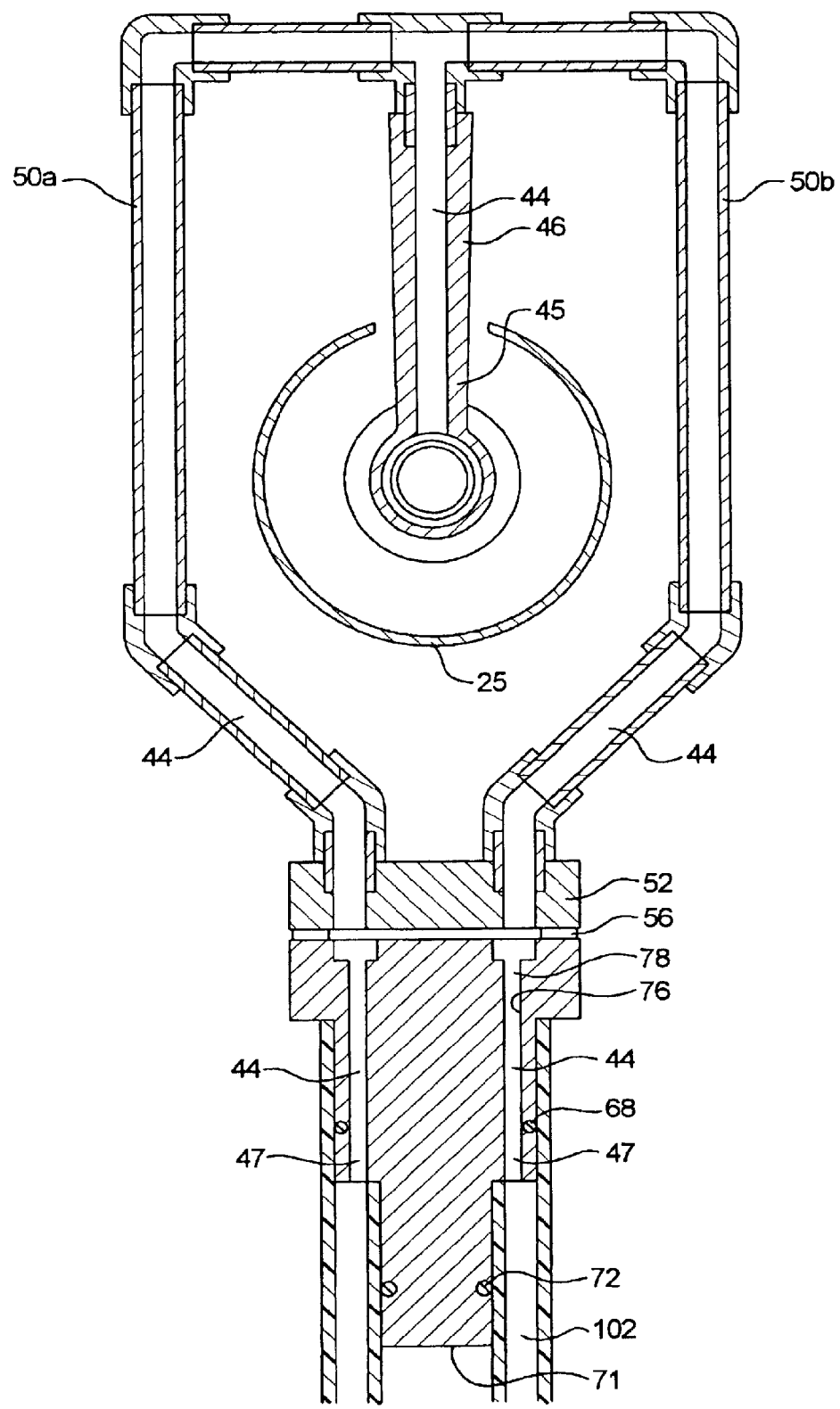
FIG. 6 is a front vertical cross-sectional view taken at line 6—6 in FIG. 3.

As seen in FIG. 6, the pressure differentiating assembly 22 is attached to the upper portion of the pressure indicating assembly 24. The rearward portion 30 has sufficient air drag to develop a moment about the central vertical axis of the pressure indicating system to ensure that the front open portion 26 is facing the wind. In operation wind is directed through the front to open portion 26 and the air molecules are constricted and accelerate to the central portion 28 a low-pressure develops. Other means of developing a low-pressure can be employed; however, a Venturi is a simple efficient method of developing a low-pressure where air movement is available. The conduit 44 is in communication with the second chamber 102 discussed later herein.

As seen in FIG. 6 in the conduit 44 is comprised from a plurality of fittings in the preferred embodiment, namely the vertical member 46 that is attached to t-connection 48 that is in communication with the lateral conduit assemblies 50 that is connected to base platform 52. The important aspect regarding conduit 44 is that it communicates the low-pressure portion of the Venturi 25 or whatever low-pressure producing device is utilized to the second chamber 102. In the preferred embodiment two lateral conduit assemblies 50a and 50b are employed to bifurcate conduit 44 into two parallel paths. This arrangement is desirable because the area between the lateral conduit assemblies 50a and 50b is used for positioning of the Venturi 25. Further, vertical member 46 helps prevent water from entering conduit 44. Of course other conduit assemblies could be utilized without departing from the functionality of conduit 44.

Figure 7:
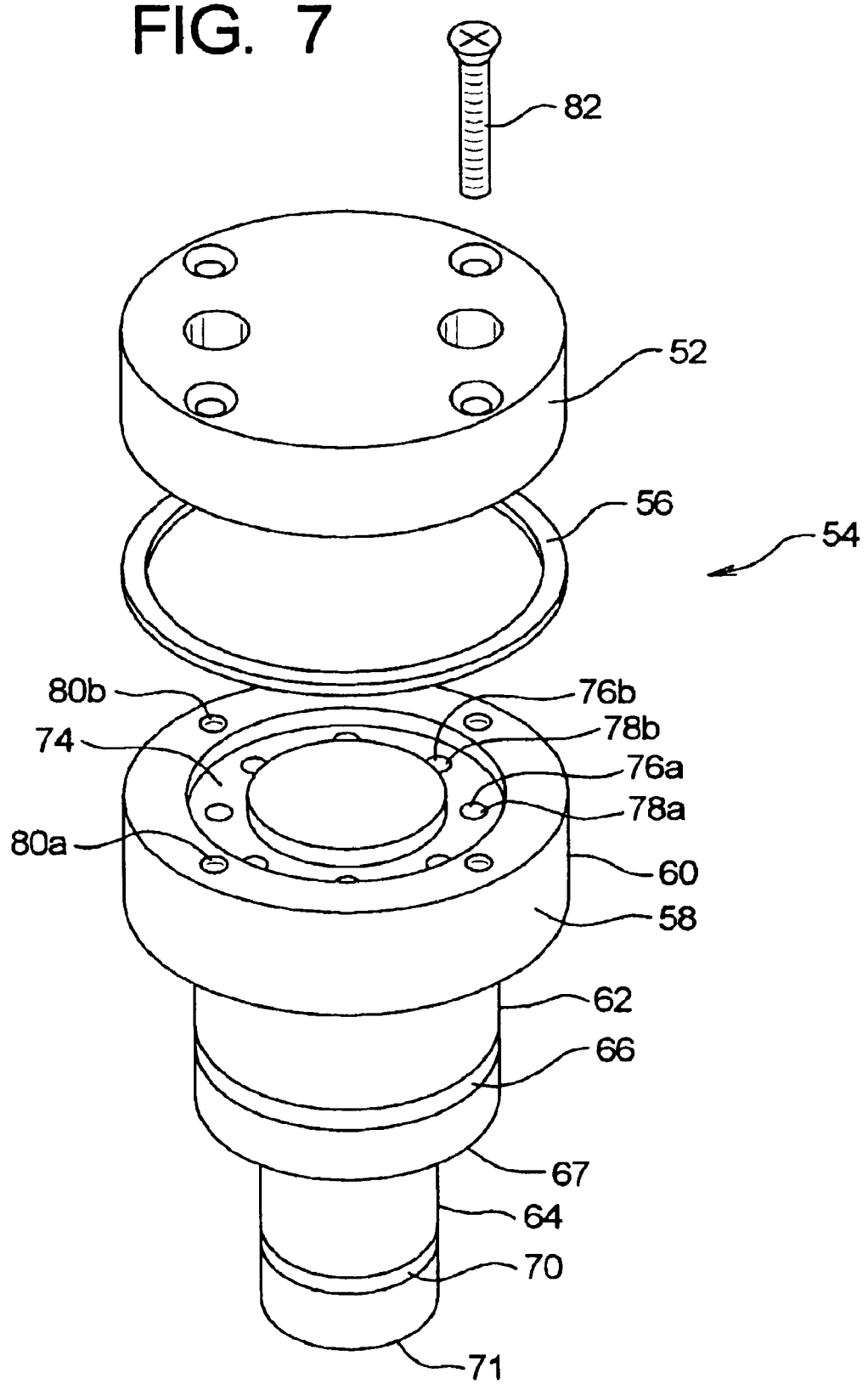
FIG. 7 is an exploded view of several of the components that comprise head assembly.

As seen in FIG. 7, there is an exploded view of a head assembly 54 which comprises base platform 52, sealant ring 56 and head member 58. The head member 58 is preferably a unitary structure having an outer surface 60, intermediate surface 62, and innermost surface 64. A portion of intermediate surface 62 is radially indented at 66 and is adapted to receive and O-ring 68 (see FIG. 6). At the lower portion of the intermediate surface 62 is an intermediate lower surface 67. Likewise, the innermost surface 64 has a radially indented portion at 70 that is adapted to receive an O-ring 72 (see FIG. 6). At the bottom portion of the head member 58 is a lower surface 71. The O-rings 68 and 72 help provide a seal for the first and second chambers 100 and 102. The functionality of the O-ring is to provide a seal and other methods for providing a relatively low-pressure seal could be employed.

The upper portion of head member 58 has an indented circular portion designated at 74. A plurality of inner surfaces 76 defined conduits 78 that extend to lower intermediate surface 67 and are in communication with second chamber 102. The conduits 78 are members of conduit 44 as shown in FIG. 6. The upper portion of head member 58 has a plurality of surfaces 80 that defined female thread receiving portions that are adapted to receive screws 82 (FIG. 7 shows a one of such screws).

The base platform 52 is bolted to the head member with screws that are received by the threaded surfaces 80. In the broader scope of the invention a number of methods could be employed to attach the head member 58 to the base platform 52. The sealant ring 56 helps provide a seal to maintain conduit 44 (see FIG. 6); however, any conventional sealant method could be employed. The important aspect of the head assembly 54 is to allow communication between the low-pressure area of the Venturi 25 to the second chamber 102.

There will now be a description of the pressure indicating assembly 24. As seen in FIGS. 8 and 9, the pressure indicating assembly 24 comprises a first surface 90, a second surface 92, a third surface 94, a lower mounting apparatus 96 and a float 98.

A first chamber 100 is primarily defined as the area between the first surface 90, the upper surface 156 and finally lower surface 71 of head member 58. A second chamber 102 is primarily defined by the third surface 94, the second surface 92, the intermediate lower surface 67 of the head assembly 58 and finally the intermediate upper surface 155 of the base member 130, The float 98 is housed within the first chamber 100.

Figure 10:
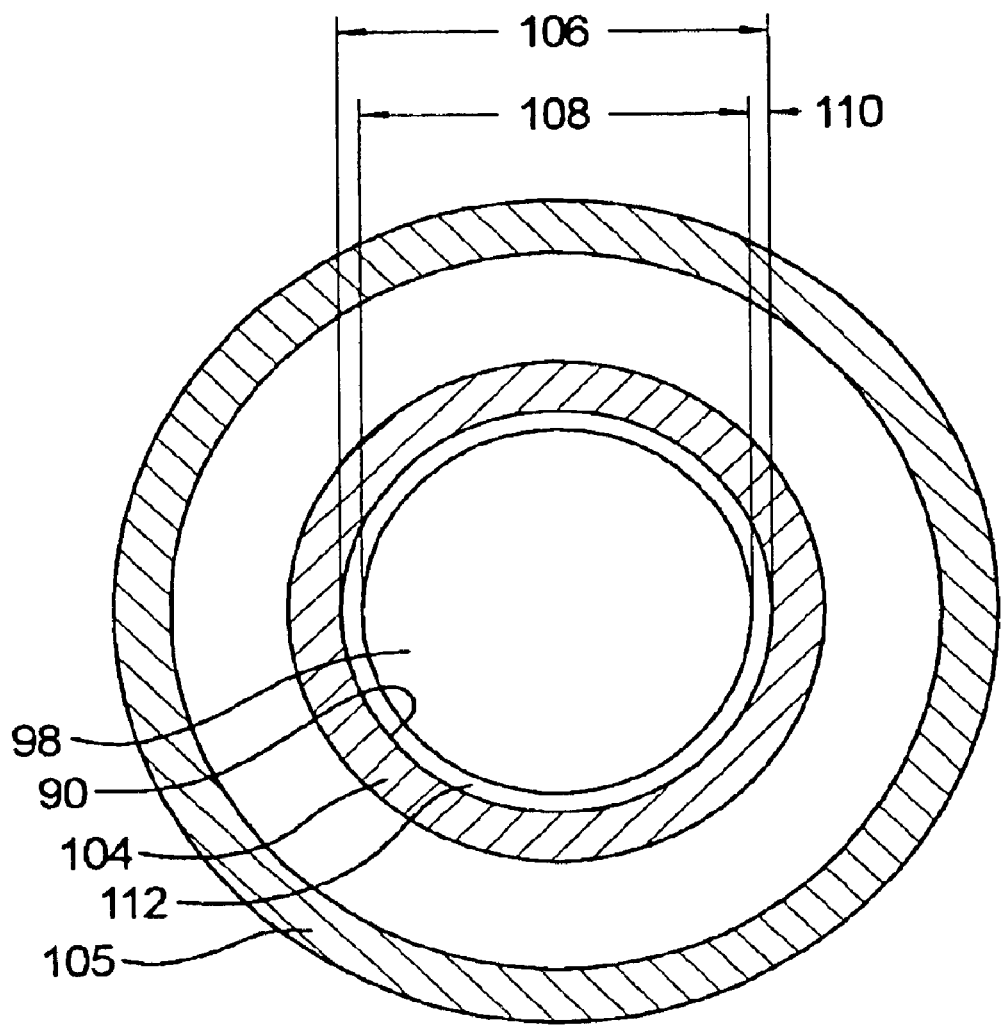
FIG. 10 is a horizontal cross-sectional view of the inner and outer cylinders that define the first and second chambers.

In a preferred form, the first surface 90 is the interior surface of a cylinder 104 that has an inside diameter indicated at 106 (see FIG. 8 and FIG. 10). Likewise, a cylinder 105 that is also transparent is a preferred structure for providing a third surface 94. It is desirable to have the horizontal cross-sectional centers of cylinders 104 and 105 to be concentric for the purposes of balance of apparatus (or anemometer) 20 and aesthetics; however, any shaped container can provide surface 94 to provide a seal for the second chamber 102. Further, it is desirable that cylinders 104 and 105 are transparent to allow users to view the vertical position of float 98. However, in the possible broader scope at the present intention, partial transparency or methods of indicating the height of the float (e.g. a static charge that is "felt" outside the apparatus to indicate the height of the float 98).

The float 98 is a spherical, low-density, and relatively light ball that has an outside diameters 108 (see FIG. 9) that is slightly smaller than the inside diameter of cylinder 104. Distances 108 minus distance 106 divided by two represents the mean annular gap 110 shown in FIG. 10. The horizontal cross-sectional area of first surface 90 subtracted from the cross-sectional area of the float 98 is the horizontal cross-sectional area 112. The mean annular gap 110 and horizontal cross-sectional area should be relatively small (i.e. 0.01 inches–0.3 inches) for proper airflow around the float 98 to create lift thereon.

The lift is generated by the form dragging of the air passing vertically around the horizontal perimeter of the float, and lift is created from the pressure difference between the first and second subchambers (120 and 122) discussed further herein.

The float can be a common ping pong ball or a ball made from Styrofoam. However, other spheres would work the important factor is the diameter to weight ratio and form dragged as well as skin friction of the float 98 that will be further discussed herein.

A spherical float 98 is advantageous because the orientation of the float does not affect the aerodynamic flow. In the possible broader scope of the present invention of different shapes could be employed (e.g. a football type shape); however, the horizontal cross-sectional area of the float must be spherical so the outer surface of the float is in close proximity to the first surface 90. It should be noted that a nonspherical cross-sectional surface float could be used with a corresponding horizontal cross-sectional first surface 90 profile (with a mean annular gap therebetween) if a shape of the float is in a manner to prevent the float from rotating and hence creating a different horizontal cross-sectional area 112 which would create different aerodynamic lift on the float 98. In other words, to maintain the aerodynamic lift of the float 98, the cross-sectional area 112 should be relatively constant. This is easy to accomplish with a spherical float where the orientation of the sphere does not affect the annular gap 110. However, any nonspherical float must have a guide mechanism (i.e. a vertically offset surface that comes in contact with first surface 90) to maintain the orientation of the float 98 to produce a constant mean annular gap 110 and horizontal cross-sectional area 112.

The cylinder 104 has a surface 114 that defines plurality of orifices 116 that comprise a conduit system and are longitudinally positioned thereon in spaced intervals. The orifices 116 provide communication between the first chamber 100 and the second chamber 102. The functionality of the orifices 116 will be discussed further herein.

The first chamber 100 is divided into two subchambers, a first subchamber 120 and a second subchamber 122. As seen in FIG. 1, the first subchamber 120 is defined as the portion of the first chamber 100 that is below float 98. The second subchamber 122 is defined as the portion of the first chamber 100 above the position of float 98. The sum of the volume of the first and second subchambers 120 and 122 and the volume of the float 98 equals the volume of the first chamber 100.

The first subchamber 120 (i.e. the lower portion of first chamber 100) is in communication with the ambient air and hence the pressure in the first subchamber 120 is atmospheric (or is very close to atmospheric). It is also advantageous to have the opening 82 at the lower portion of the first chamber 100 to allow accumulated moisture contained therein to drain out of the apparatus 20.

There will now be a discussion of the lower mounting apparatus 96 with primary reference being made to FIGS. 8–9. As seen in FIG. 9, the lower mounting apparatus comprises a base member 130, a bearing housing 132, a first bearing 134, a second bearing 136, a connector assembly 138, a lower baseplate 140, and a plurality of support legs 142.

The base member 130 is preferably a unitary structure that could be made from a milling operation or cast molding. The base member 130 has an outer surface 144, an intermediate surface 146, and an inner surface 148. The intermediate surface 146 has an annular recess gap 150 that is adapted to receive the O-ring 152. The inner surface 148 has an annular gap 154 has adapted to receive an O-ring 156. The O-rings 152 and 156 will provide a seal for the first and second chambers. Of course in the broader scope of the invention other methods of joining transparent cylinders 104 and 105 to the base member 130 could be employed.

The base member 130 further comprises a bearing shaft 152 that is adapted to extend through bearings 134 and 136 discussed further herein. Located in the central portion of the base member 130 is an annular flange 154 that extends over upwardly extending annular flange 180 of the bearing housing 132. The annular flange 154 helps prevent water or other fluids from entering the interior portion of the bearing housing 132. Preferably the outer surface 144 is cylindrical and in substantial alignment with the outer surface 172 of the bearing housing 132 to create a sleek aesthetically pleasing appearance as shown in FIG. 8.

At upper portion of the base member 132 there is a upper surface 156 and a plurality of base elements 158 that are adapted to hold the float 98 (see FIG. 9). Located in the central portion of the base member 130 is an inner surface 160 that defines a conduit 162. The conduit 162 is in communication with the first subchamber 120 and the ambient air (through conduit 192 of bolt 186).

The bearing housing 132 has an inner open area 170 and outer cylindrical surface 172. An interior annular flange 174 is located in the inner portion of the bearing housing 32 and has an upper surface 176 and a lower surface 178.

Located in the upper portion of the bearing housing 132 is an annular flange 180 that is positioned radially inwardly from annular flange 154 of the base member 130. In the lower portion of bearing housing 132, a plurality of holes are provided that are adapted to receive bolts that attach lower baseplate 140 thereto.

The bearings 134 and 136 (the bearing assembly) allow the base member 130 to freely rotate with respect to the bearing housing 132. As seen in FIG. 1 and FIG. 8, the cylinders 104 and 105 are rigidly attached to the base member 130 and hence the entire assembly above the base member 130 rotates in order to have the pressure differentiating system 22 be properly orientated to face the wind. In the preferred embodiment the front open portion 26 of the Venturi 25 will always face the wind where the rearward portion 30 supply sufficient drag to allow the Venturi 25 to rotate horizontally. In the broader scope of the invention, a bearing assembly could be placed in the upper portion of the apparatus 20, or in the environment where the incoming wind is at a consistent direction, no bearing assembly would be required.

The bearing 134 rests between upper surface 176 of bearing housing 132 and below the lower surface 145 of base member 130. Bearing member 136 is positioned below lower surface 178 of bearing housing 132 and the connector assembly 138 comprising a bolt 186 and a washer 188 exerts a vertical force upon the bearing 136 to keep it housed therein the central area 170 of bearing housing 132. The lower portion of central surface 160 of base member 130 is threaded an adapted to receive bolt 186. Of course other connector assemblies other than a bolt and washer assembly could be employed. The important aspect of the bearing assembly 135 is that one rotational member of bearing 136 is in engagement with base member 130, and the second rotational member of bearing 136 is in engagement with bearing housing 132. It is advantageous to use thrust bearings that can take vertical loads exerted thereon. The bolt 186 is provided with a central surface 190 that defines a central conduit 192. The central conduit 192 is in communication with or a part of conduit 162 of the base member 130.

In the preferred form, a filter 191 is positioned somewhere along the conduit 162, preferably in between the bolts 186 and the lower base plate 140. The filter helps prevent dust, debris and insects from entering the first chamber.

At the bottommost portion of the apparatus 20, a baseplate 140 is attached to bearing housing 132 via screws 194. On the bottom surface of baseplate 140 a plurality of support legs are attached thereto. The support legs are rigidly attached to a base platform 196. Because the apparatus 20 is adapted to be in an environment where there is air movement (e.g. wind), a moment about a horizontal axis can develop which would tumble the apparatus 20 if it were not supported at the lower portion. In one preferred form the support legs 142 are first bolted to the lower baseplate 140 (where the interior cavity of the legs 142 are threaded). Then the baseplate 142 is bolted to the bearing housing 132 with screws 194. Finally, screws 200 extend through hole 202 and are received by the threaded interior portion 204 of the support legs 142. Of course numerous methods could be used to rigidly attached the lower portion of apparatus to a rigid surface. For example, as a public piece of art, the apparatus 20 may be cemented into the earth h cutbacks base key as a permanent structure to avoid theft.

There will now be a discussion of the overall operations of the apparatus 20. The orifices 116 allow air to pass therethrough. The orifices 116 are at a precise cross-sectional area to allow proper resistance of flow between the first and second chambers 100 and 102. An analysis of the airflow from the first chamber 100 chamber (i.e. subchambers 120 and 122) to the second chamber 102 will now be discussed in detail.

As seen in FIG. 2, as air passes to the front open portion 26 represented by arrow 198 of ensuring 25 and low-pressure develops in conduit (or first conduit) 44 which develops a low-pressure in the second subchamber 122. The second chamber 102 is in a "lower pressure" state with respect to first chamber 100 therefore airflow occurs between the first chamber 100 to the second chamber 102 through orifices 116 (represented by arrows 200). As air exits from first chamber 100 to second chamber 200 ambient air flows upwardly through conduit 162 of the lower base assembly 135 (the airflow represented by arrow 202. This causes lift upon float 98 which raises it upwardly inside the first chamber 100 (see FIG. 1).

Figure 11:
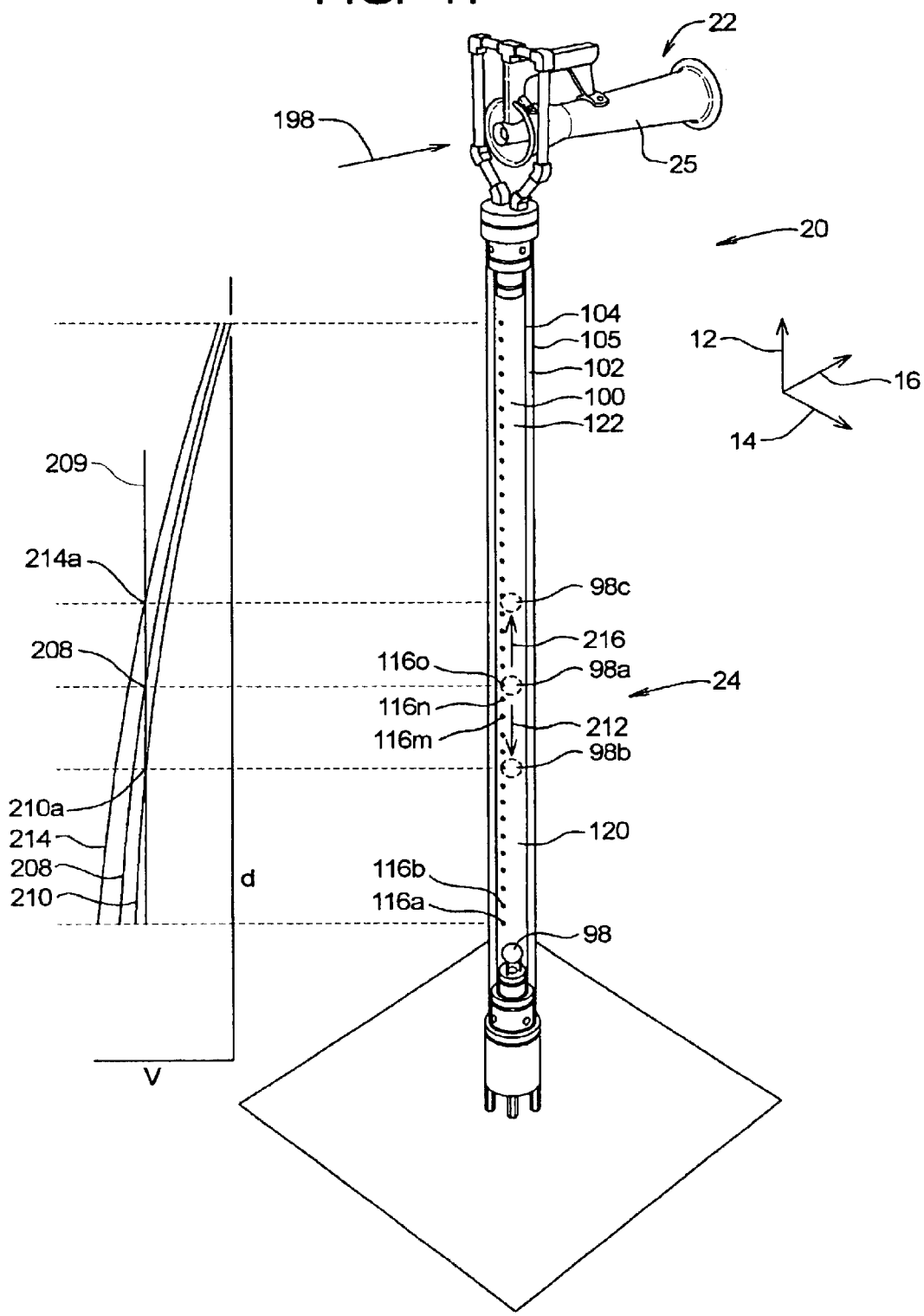
FIG. 11 illustrates the dynamic action of the float housed in the first chamber.

As seen in FIG. 11, the float 98 is suspended at a position indicated by the partially broken line indicated at 98*a*. Therefore, orifices 116*a*–116*m* are below the float. Hence, the vertical airflow around the annular cross-sectional area 112 (see FIG. 10) around the float 98 is less. In other words, the vertical airflow decreases with respect to the vertical position along cylinder 104 (that substantially defines chamber 100). As mentioned above the lift upon the float 98 must be equal to the gravitational force upon the float for the float 98 to be in equilibrium. The vertical force upon the float is a function of the airflow around the float. The volumetric airflow inside the first chamber 100 is represented as line 208 in FIG. 11. The volumetric flow curves 208, 210 and 214 have a concave down shape because the greatest pressure difference between the first chamber 100 in the second chamber 102 is near orifice 116*a*. Because the float resistance is a function of the square of the velocity of the flow through the orifices 116, the vertical flow gradient will be greater at the upper portion of the apparatus 20. Therefore, as the float is displaced vertically airflow decreases. The rate of change (the derivative) of airflow increases as the float displaces vertically. When the vertical force on the float 98 caused by the vertical airflow is equal to the weight of the float 98, the float will cease moving vertically and be in equilibrium. The equilibrium airflow and the first chamber 100 is indicated as line 209. This is the velocity of air around the float 98 that creates the requisite vertical lift to equal the weight of the float 98. At the position of float at 98*a* the velocity within the first chamber 100 (defined by cylinder 122) is indicated as curve 208.

If the wind 198 entering the Venturi 25 decreases in velocity with respect to the apparatus 20 the pressure and second chamber 102 will raise slightly (but still be below atmospheric pressure), and hence the pressure differential between the first chamber 100 and the second chamber 102 will be less and hence the vertical airflow within the first chamber 100 will be decreased. The decrease in vertical white metric flow is represented by line 210 in FIG. 11. Therefore the vertical lift upon the float shown at position 98*a* decreases float shown at 98*a* will lower indicated at arrow 212 to a position of the float indicated at 98*b*.

Likewise, if the velocity of the wind 198 with respect to the Venturi 25 increases, the pressure difference between the first chamber 100 (in communication with ambient air, zero gauge pressure) and the second chamber 102 (negative gauge pressure) will be greater and hence the vertical volumetric flow will increase to a curve 214 with respect to the vertical distance "d" of the apparatus 20. Hence, the float will move vertically as indicated by arrow 216 to a load of the float indicated at 98*c*. Of course these curves 208, 210, and 214 are shown for exemplary purposes to illustrate the fundamental pressure differences and the vertical volumetric flow. In the preferred embodiment the passage from the first chamber 100 to the second chamber 102 is accomplished by orifices 116. Therefore the volumetric flow curves indicated at 208, 210, and 214 are slightly stepped. Of course, if a continuous slit vertically extending along cylinder 122 is used (see FIG. 12 for the second embodiment) the curve would be more continuous. Further, it should be noted that the flow around the cross-sectional open area 112 (see FIG. 10) restricts the vertical flow of air to some degree causing extra resistance. Therefore, as seen at points 208*a* there is an extra pressure drop between orifices 116*n* and 116*o* because of the extra resistance caused by float at 98*a*. The significance of this pressure drop is more relevant in the second embodiment where multiple floats are employed. This pressure drop is of course present at float locations 98*b* and 98*c* and is indicated at points 210*a* and 214*a*. The pressure drop translates into a change if volumetric flow shown in the graph.

It should be noted, that because the cross-sectional area of the first chamber 100 is substantially constant, the velocity of the air inside the first chamber can be determined by dividing the volumetric flow inside the first chamber by the horizontal cross-sectional area of the first chamber. Therefore, the graph shown in FIG. 11 is proportional to the velocity of the air moving vertically in first chamber 100 with the exception as to when the air travels around the float 98 (at this location the cross-sectional open area changes with respect to the vertical location along the float 98).

Figure 12:
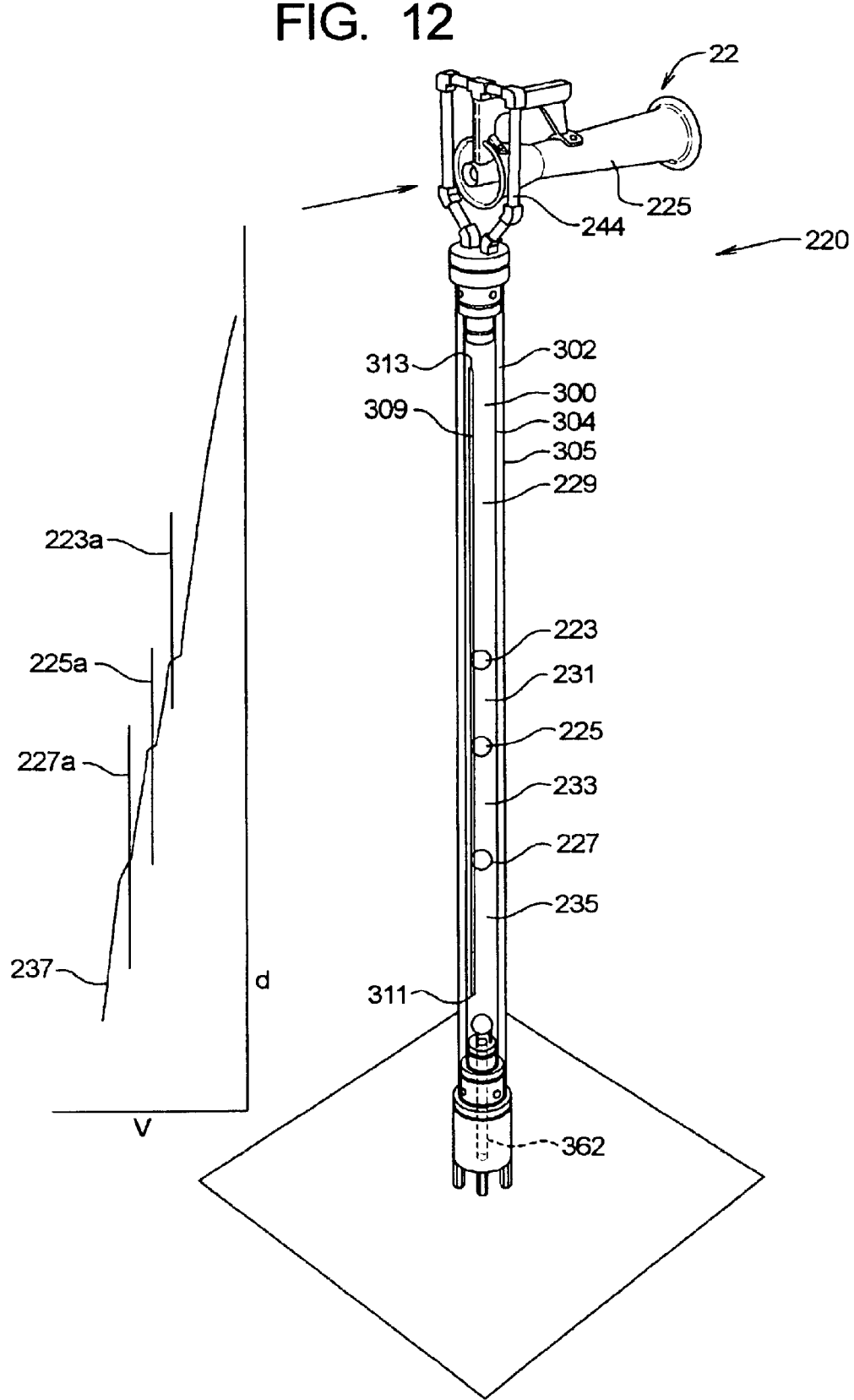
FIG. 12 is a second embodiment showing multiple floats housed in the first chamber.

A second embodiment of the present invention is shown in FIG. 12. The major differences in the second embodiment is a plurality of floats 223, 225 and 227 are positioned in the first chamber 300, and a continuous vertical slit replaces a plurality of orifices 116. Otherwise, the description of the first embodiment with reference to FIGS. 1–11 is relevant to the description of the second embodiment in FIG. 12. Where possible, the numerals designating the components of the apparatus 220 will correspond to the numerals of the first embodiment except increased by an increment of two hundred.

Figure 13:
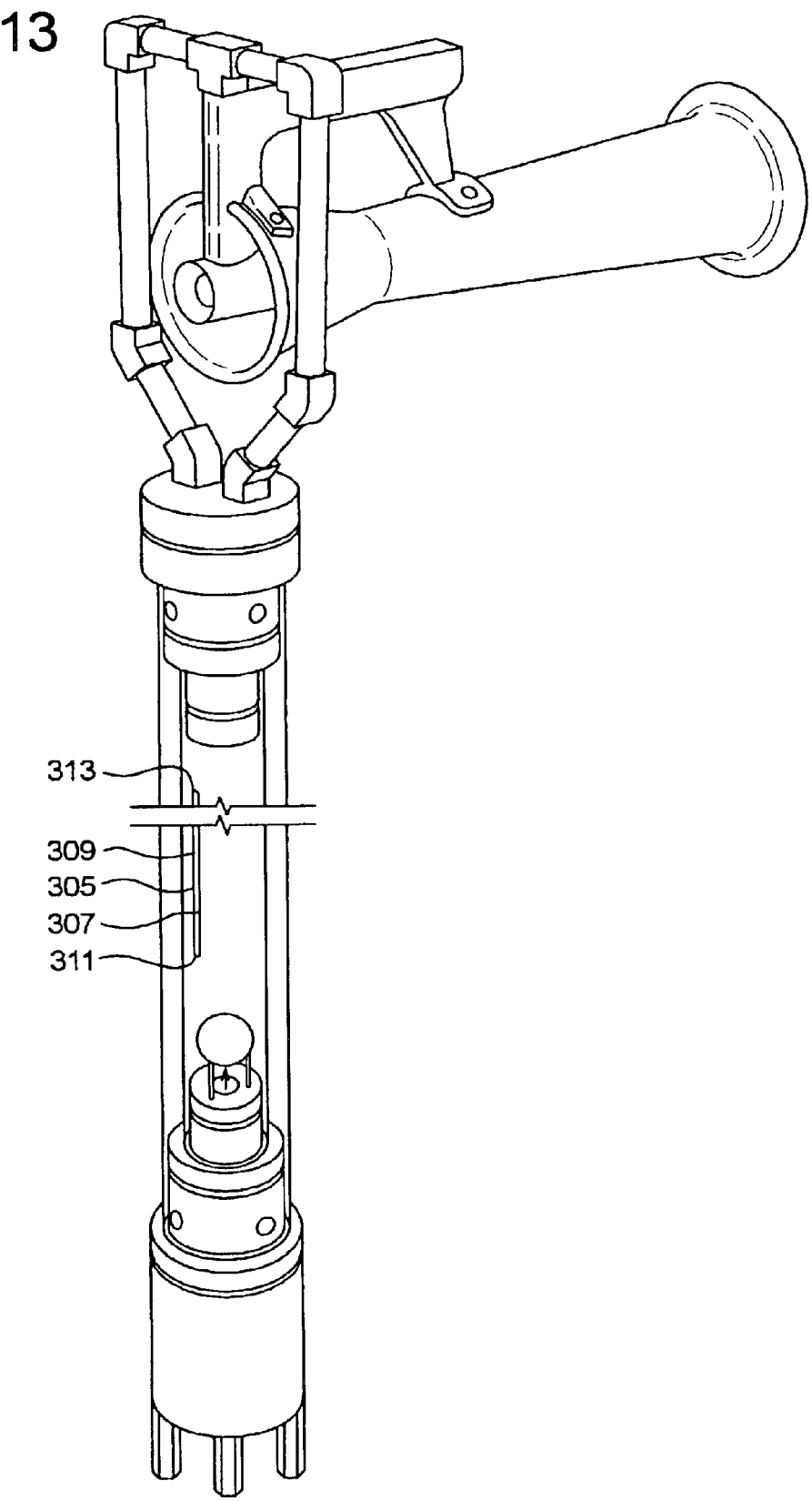
FIG. 13 is an isometric view of a close-up of the upper portion of the second embodiment of the apparatus and a close-up of the base portion of the apparatus where a vertical slit replaces the plurality of orifices.

The apparatus 220 comprises a first cylinder 304 and a second cylinder 305. The first cylinder has a vertically extending surface 305 and 307 that define the vertical slit 309 (see FIG. 13), The vertical slit 309 has a lowermost portion 311 and then uppermost portion 313 The vertical slit 309 functions similarly to the plurality of orifices 116. A conduit 244 functions similarly to conduit 44 of the first embodiment where it communicates the low-pressure portion of the Venturi 225 to the second chamber 302.

The second variation in the second embodiment is a plurality of floats 223, 225, and 227 are employed. By using a number of floats a greater range of velocities of wind can be measured and an interesting dynamic movement of the floats occurs.

A plurality of subchambers are defined where subchamber 229 is defined as the portion of first chamber 300 located above float 232. A second subchamber 231 is defined as the portion of first chamber between floats 223 and 225. A third subchamber 233 is defined as the portion of first subchamber between floats 225 and 227. Finally, a fourth subchamber 235 is defined as the portion of first subchamber 300 below float 227. Of course it should be noted that any number of floats could be employed and hence define a corresponding increased number of defined subchambers.

To better understand how the vertical spacing between the floats 223,225, and 227 occurs, reference is made to FIG. 12. On the left hand portion is a graph illustrating the volumetric flow "v" of air in first chamber 300 with respect to the vertical distance along the apparatus 220. As mentioned above in the first embodiment, as the air flows around the floats, the cross-sectional open area 112 and the mean annular gap 110 (see FIG. 10) is such that sufficient when resistance occurs to create a pressure difference between the subchamber above the float and the subchamber below the float.

With that in mind, we will assume the floats 223, 225, and 227 have decreasing outside diameters respectively. Further, let us assume the densities of the floats are similar, therefore each float requires different air velocity/sub chamber pressure differential to create a requisite lift to overcome the floats' gravitational weight.

As seen in FIG. 12, the ambient air flows upwardly from lower conduit 362 into the fourth subchamber 235 of first chamber 300. As soon as the upwardly flowing air reaches the lowermost portion 313 of vertical slit 309, the pressure slowly begins to drop due to the volumetric flow therethrough slit 309 to the second chamber 302. The vertical lines 227a, 225a and 223a indicate the requisite volumetric flow in chamber 300 to create sufficient lift to overcome each of the floats respective gravitational weight. Located at the intersection between line 223a and volumetric flow line 237 there is a sharp drop in volumetric flow. The drop in volumetric flow is a result of the air resistance developed when traveling around float 223. The resistance around the float 223 causes a and increased pressure drop between the subchambers 229 and 231 which causes a lower volumetric flow rates through the lower portion subchamber 229 and the upper portion of subchamber 231. Of course this rationale is relevant to the additional floats (225 and 227 as well as additional floats that could be placed in chamber 300).

There are two ways of analyzing the lift characteristics of the float. Each analysis is not mutually exclusive of the other. The first method of analyzing the lift characteristics is a pressure differential between the subchamber above the float and the subchamber below the float. The second method of analyzing the lift is to examine the velocity of airflow immediately around the float. Of course a greater pressure differential between the upper and lower subchambers around the float will create a higher velocity of flow around the float. The air velocity around the floats 223, 225, and 227 is somewhat complex because the open cross-sectional area changes from the lowermost portion of each float to the uppermost portion of the float. Further, the bottom most float (float 227 in FIG. 12) has a smaller diameter (therefore a greater cross-sectional open area see FIG. 10 reference 112) than the upper floats 225 and 223. Therefore a given vertical volumetric flow in chamber 300 will have a lower velocity around float 227 which is why the line 227a is further left requiring more volumetric flow to overcome the weight of float 227.

Of course the conduit system 305 in the second embodiment could be replaced with the plurality of orifices 116 in the first embodiment.

While the invention is susceptible of various modifications and alternative forms, specific embodiments thereof have been shown by way of example in the drawings and will herein be described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

I claim:

1. An anemometer adapted to be positioned in air that is moving relative to the anemometer, said anemometer comprising:
   a pressure differentiating system having a low-pressure portion, a low pressure conduit having a first end portion and a second end portion where the first end portion is in communication with the said low-pressure portion;
   a pressure indicating system with a vertical axis comprising:
   i. a first chamber defined at least in part by a first surface portion having an upper portion, a middle portion, and a lower portion, the cross-sectional area of the first chamber being substantially constant with respect to vertical location in the first chamber, a second conduit having a first portion and a second portion where the first portion of the second conduit is in communication with the lower portion of the first chamber and the second portion of the second conduit is in communication with ambient air so that the lower portion of the first chamber is open to ambient air at a lower first chamber location;
   ii. a second chamber defined at least in part by a second surface portion, where a conduit system is provided between the second chamber and the first chamber in a manner that air flow communication is provided along the lower portion, middle portion and upper portion of the first chamber to the second chamber, the second end portion of said first low-pressure conduit of the pressure differentiating system being in communication with the second chamber;
   iii. a third surface which is positioned radially outward from the said second surface and further partially defines the second chamber;
   iv. a float positioned in said first chamber above said lower first chamber location that is in communication with ambient air;
   v. said first chamber comprising a first subchamber defined as the portion of the said first chamber located above said float, and a second subchamber defined as the portion of said first chamber located below said float;
   whereby the system is arranged so that when low-pressure develops in a low-pressure area of the pressure differentiating system creating a lower pressure in said second chamber causing air to flow from said first chamber through the conduit system, ambient air flows as inflowing ambient air through the second conduit to the second subchamber and a portion of the inflowing ambient air flows to the first subchamber and causes lift upon the float.

2. The apparatus as recited in claim 1 wherein said pressure differentiating system comprises a Venturi having a front portion, a central portion, and a rearward portion, with the central portion being the low-pressure portion of the pressure differentiating system.

3. The apparatus as recited in claim 2 wherein the Venturi is mounted in said anemometer about a vertical axis of rotation in a manner to rotate in a horizontal plane.

4. The apparatus as recited in claim 3 wherein the rearward portion of the Venturi is arranged to create sufficient wind drag to rotate the Venturi so that the front portion of the Venturi property faces wind blowing toward the anemometer.

5. The apparatus as recited in claim 1 wherein said conduit system comprises a plurality of orifices positioned vertically on the first chamber.

6. The apparatus as recited in claim 1 further wherein said orifices are substantially evenly spaced with respect to one another.

7. The apparatus as recited in claim 2 wherein said orifices are arranged to cause a decreasing pressure within said first subchamber with respect to a vertical location of said float in the first chamber.

8. The apparatus as recited in claim 1 wherein the first surface portion is an interior surface of a transparent cylinder.

9. The apparatus as recited in claim 8 wherein the second surface portion is the interior surface of a second transparent cylinder.

10. An anemometer comprising:

an indicating section, comprising:
  i. an indicating member defining an elongate chamber having an upper end at least partially restricted from ambient pressure, and a lower end at least partially exposed to ambient pressure, said elongate chamber having a lengthwise axis which has a vertical alignment component;
  ii. an indicating element which is positioned in said chamber for movement to various indicating locations along said lengthwise axis, said chamber comprising upper and lower subchambers located, respectively, above and below said indicating member;
  iii. said indicating member and said indicating element being arranged so that there is provided a restricted air passageway leading between the lower subchamber and the upper subchamber;

a wind responsive activating section comprising:
  i. a wind responsive portion to provide a pressure region where air pressure varies in accordance with wind velocity;
  ii. an activating portion which connects said pressure region with flow locations along at least a substantial portion of said elongate chamber to cause flow of air between said elongate chamber and said pressure region at said flow locations in response to differences in air pressure between said pressure region and said elongate chamber at said flow locations;

whereby, when a wind creates a pressure differential between said pressure region and ambient pressure, there is air flow through said flow locations and air flow through said restricted air passageway so that there is a pressure differential between said first and second subchambers, with said indicating element responding to said pressure differential between said upper and lower subchambers to position itself at an indicating location related to wind velocity.

* * * * *